US011630678B2

(12) United States Patent
Natan et al.

(10) Patent No.: US 11,630,678 B2
(45) Date of Patent: Apr. 18, 2023

(54) METHOD FOR COMPONENTIZATION OF ENTERPRISE APPLICATIONS USING PLUGINS

(71) Applicants: Asaf Ben Natan, Tel Aviv (IL); Avishay Ben Natan-Muehlrad, Tel Aviv (IL)

(72) Inventors: Asaf Ben Natan, Tel Aviv (IL); Avishay Ben Natan-Muehlrad, Tel Aviv (IL)

( * ) Notice: Subject to any disclaimer, the term of this patent is extended or adjusted under 35 U.S.C. 154(b) by 34 days.

(21) Appl. No.: 17/340,085

(22) Filed: Jun. 6, 2021

(65) Prior Publication Data
US 2021/0382731 A1    Dec. 9, 2021

Related U.S. Application Data

(60) Provisional application No. 63/035,780, filed on Jun. 7, 2020.

(51) Int. Cl.
*G06F 3/00* (2006.01)
*G06F 9/445* (2018.01)
*G06F 9/54* (2006.01)

(52) U.S. Cl.
CPC ............ *G06F 9/44526* (2013.01); *G06F 9/54* (2013.01)

(58) Field of Classification Search
CPC ...................................................... G06F 9/54
USPC ........................................................ 719/310
See application file for complete search history.

(56) References Cited

U.S. PATENT DOCUMENTS

| 10,476,936 B1* | 11/2019 | Retnakumari ............ G06F 9/54 |
| 2020/0142965 A1* | 5/2020 | Weldemariam ....... G06F 16/214 |
| 2021/0240497 A1* | 8/2021 | Thulasi .................. G06F 13/20 |

OTHER PUBLICATIONS

Allan Raundahl Gregersen, Extending eclipse RCP with dynamic update of active plug-ins. (Year: 2005).*
Chuan Ho Loh, Towards A Dynamic Object-Oriented Design Metric Plug-in Framework. (Year: 2008).*

* cited by examiner

*Primary Examiner* — Lechi Truong

(57) ABSTRACT

The present invention relates to a software method for componentized enterprise applications for backend development based on Spring Boot and Java EE application server using plugins. The object of the present invention is to build back end servers and desktop applications from reusable plugins. Another object of the present invention is the benefits of a single process implementation and truly decupled parent child dependency. Moreover, the present invention is to build entire applications (deployment in application server or Spring Application) from separate and easy to maintain run time components. Finally, the percent invention is that the invention can be used by almost any development team using Java EE and Spring for back end enterprise development. Moreover, the present invention is to allow plugins to provide their services either in the same process or on a remoter server in a transparent way to their services consumers.

21 Claims, 9 Drawing Sheets

FIG. 5

In Java EE, beans are being instantiated when explicitly required to by code (get Plugins method), when injected into another currently instantiated bean the injected beans will be created. — 106a In Java EE, upon CDI events the system instantiates the bean. — 106b In Java EE, Upon activation of a JAX-RS resource a special interceptor instantiates a new instance of the required JAX-RS bean at the correct version — 106c

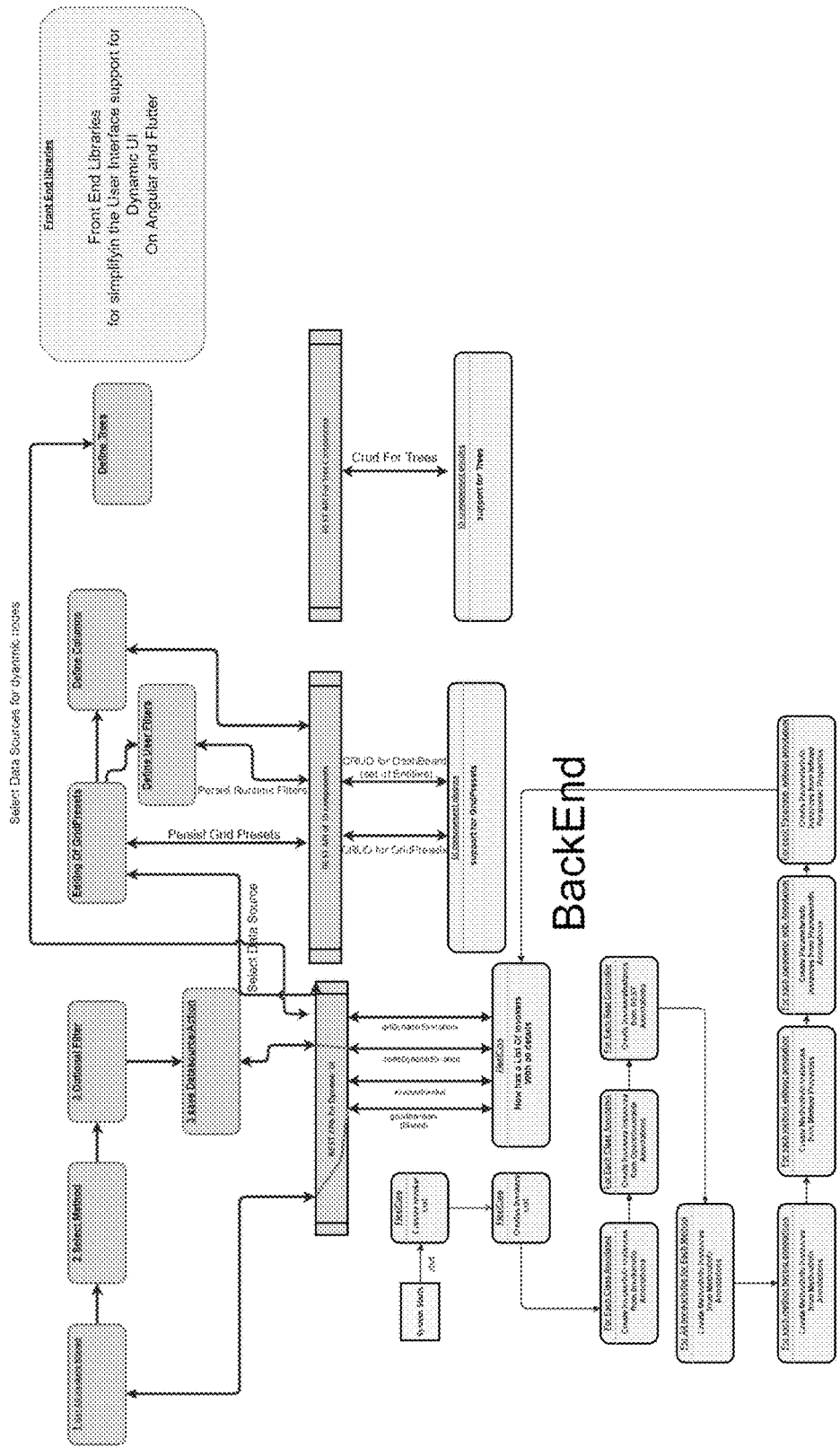

METHOD FOR COMPONENTIZATION OF ENTERPRISE APPLICATIONS USING PLUGINS

CROSS-REFERENCE TO RELATED APPLICATIONS

For purposes of the USPTO extra-statutory requirements, the present application constitutes a nonprovisional patent application of U.S. provisional patent application Ser. No. 63/035,780, entitled "A METHOD FOR COMPONENTIZATION OF ENTERPRISE APPLICATIONS USING PLUGINS", naming ASAF BEN NATAN and AVISHAY BEN NATAN-MUEHLRAD as inventors, filed Jun. 7, 2020.

FIELD OF THE INVENTION

The present invention relates to software for componentized enterprise applications for backend development on Java EE application server and Spring Boot based servers. Particularly, using plugin method based on Spring and Java EE server.

BACKGROUND OF THE INVENTION

The disclosed invention deals with building better componentized enterprise applications for backend development based on Spring Boot and Java EE application servers. The solutions for breaking monolithic applications to manageable parts becomes obsolete in most cases. The popular solution for avoiding monolithic systems is using micro-services. However, with this micros-service solution some of the limitations are presented below:

If a single micro-service provides database services via Representational State Transfer Application Programming Interface (REST API) to other micro-services it becomes dependent on them, that is, when any of the dependent micro-service needs a schema change, the database service must be changed. Moreover, the API for accessing the database provider database should also be changed. Similarly, data may be stored as a JSON documents database, however, the data provider must be aware of the data structure for supporting joins among different tables (collections) so dependency cannot be avoided.

Another problem, if each microservice requiring data is managing its own database, one service cannot extend the schema created by another service. Specifically, the domain model of each microservice becomes isolated and later the duplications and replications become inevitable.

Yet another problem, the loose coupling among micro-services has performance issues, data must be serialized and deserialized and passed through real or virtual on system network, a solution based on a single process, as the present invention uses, has many advantages, the present invention allows single process componentized, non-monolithic systems.

Yet another problem, de-coupling micro-services is nearly impossible without architectural drawbacks as services must be changed to support changes in dependent services. Additionally, with the present invention, micro-services can still be used by building them from plugins and by allowing the set of plugins in each micro-service to be modified based on experience with no additional work. In-process plugins have the advantages of micro-services (almost all of them) without the distributed nature of microservices preventing shared memory access to the same objects, and true de-coupling.

These and many other problems have been long identified. Different solutions to the problems have been tried. However there exists no comprehensive solution to all the above problems.

Therefore, the object of the invention overcomes the limitations and drawbacks from the prior art. To achieve above and other objects, the present invention anticipates a new and entirely different method that resolves the limitations and drawbacks.

There are prior art solutions for Plugins for the Spring framework but these are not capable of implementing the full set of services a backend must provide and are not capable of being deployed in layers where plugins can be discovered and provide services to other plugins.

The object of the present invention is to build an entire applications (deployment in application server or through Spring Boot) from separate and easy to maintain components which are deployed in run time and the main application is never aware of their existence in compile and build time. Generic version of the framework is assumed. That is, the framework is never changed to support a specific application.

Further object of the present invention is to allow the addition of plugins to existing Spring Boot applications, keep development in plugins or mix plugins and Spring boot application core. In such scenario, when plugins are introduced after some of the application has been implemented, a hybrid operation must be supported.

Another object of the present invention is that the components (classes in plugins) must be inter-injectable and provide services to one another with no limitations using the standard CDI (Contexts and Dependency Injection) implementation and annotations on Java EE @Inject and Spring @Autowired annotation.

Another object of the present invention is to provide a support dynamic data sources and actions from created REST API end points and from any public method in a transparent and automatic way, thus allow the building of truly adaptable user interfaces and also third party systems consuming the said system services in a generic way. The user interface should be compatible with additional APIs, services and domain models without any work from front end developer. Unlike solutions such as GraphQL, support for dynamic user interface should be transparent and require no additional work from the back-end developers. In addition, data queries should be optimized and be executed in the database layer. Front end developers need to add support for the general definition of dynamic UI components such as DataGrid, for instance. This is one time effort for every application and is future proof when new services are introduced at the backend.

Yet another object of the present invention is, the components should be able to define new API REST endpoints. API REST clients (other servers, browser-based clients, mobile devices) should see the aggregated list of all API endpoints created by all loaded plugins plus the generic endpoints the framework provides. Specifically, tools like Swagger should be able to create client-side SDK (Software Development Kit) from API plugins provide.

Further object of the present invention is that, additional services normally provided by Spring Boot or Java EE application server must be supported inside plugins so applications can be fully implemented in plugins. These services should include, on top of the abovementioned services: jax-rs, web sockets, GraphQL, Spring Data Rest, Spring Remoting, Spring Health Check, Further object of the present invention is that, the components should be compatible with CDI and Spring event bus. So, plugins can send events consumed by other plugins.

Yet another object of the present invention is, the components should support multiple versions of the same business classes, that is, multiple implementations for the same service should co-exist on the application server. Clients should be able to override the default version. A different execution chain should be thus possible.

Further object of the present invention is, the components should be able to take advantage of existing framework code (Flexicore) using existing services and existing services of plugins they depend on. Specifically, the components should seamlessly enjoy services that Flexicore provides, this includes Flexicore high end multi-tenancy access control and reliable database synchronization for IoT and other markets. When used with other Spring Boot applications, these services require an optionally added module for each group of services. Once added, plugins can use these services without a change to the host application.

Yet another object of the present invention is, the components should be able to extend entities through inheritance defined in other components and in the generic core framework. Specifically, entity inheritance is a supported in standard Java JPA, however not among different entities defined in different plugins.

Further object of the present invention is, the components providing services should never be forced to be changed when a dependent component changes.

Yet another object of the present invention is that, the components defining entities should never be forced to change because of changes required in entities extending them.

Further object of the present invention is that, the disclosed method can be used by almost any development team using Java EE and Spring Boot for backend enterprise development.

Yet another object of the invention is to allow the flexible use of plugins when building Micro-services by allowing different packaging of a MicroService and or by providing both local, in process and remote services of a plugin without any awareness of the consumers of said services.

Yet another object of the invention is to allow solutions providers to use the invention so their qualified customers can extend existing systems with plugins having access to all of the hosting system capabilities, limited perhaps by commercial constraints.

To achieve above and other objects, the present invention provides a plugins method which have the advantages over the micro-services (almost all the above-mentioned problems), without the distributed nature of microservices preventing shared memory access to the same objects. Additionally, the present invention provides a componentization of enterprise applications using the invention comes with absolutely no architectural drawbacks while keeping all the huge benefits.

SUMMARY OF THE INVENTION

The object of the present invention is to provide componentization of enterprise applications for backend development based on Java Spring Boot and Java EE application servers using plugin method. Specifically, the disclosed method provides building backend servers and desktop applications from reusable plugins.

In accordance with an embodiment of the present invention, when building servers to match different customers needs, without the invention, systems tend to grow in time to include a monolithic mixture of all features added during the lifetime of a product. Moreover, and worse, some development teams opt to maintain different versions for different customers, this is a non-recommended practice. In accordance with an embodiment of the present invention, this invention allows features to be added as plugins to customers requiring it. Adding plugins can be done during installation or over the air. Additionally, the invention solves all the issues associated with microservices while providing 90% of their benefits.

In accordance with an embodiment of the present invention, dependency injection of plugins with any depth of dependency hierarchy, that is plugins can provide services to other plugins.

In accordance with an embodiment, the present invention is novel as it particularly provides dependency in one direction among any number of dependency layers of plugins without limiting the solution in anyway.

In accordance with an embodiment of the present invention, building Java EE server applications and Spring Boot applications from components and only from components while using the benefits of a single process implementation and truly de-coupled parent child dependency, that is, children plugins can be modified without effecting their parents (depend-on) plugins. This is not available with other technologies.

This summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following detailed description, figures, and claims.

BRIEF DESCRIPTION OF THE DRAWINGS

The prior and other objects of this invention, the various features thereof, as well as the invention itself, may be more fully understood from the following description, when read together with the accompanying drawings in which:

FIG. 5 provides a flow diagram describing instantiation of beans.

FIG. 9 provides an overview workflow of the dynamic UI.

DETAILED DESCRIPTION OF THE INVENTION

Figure 1:
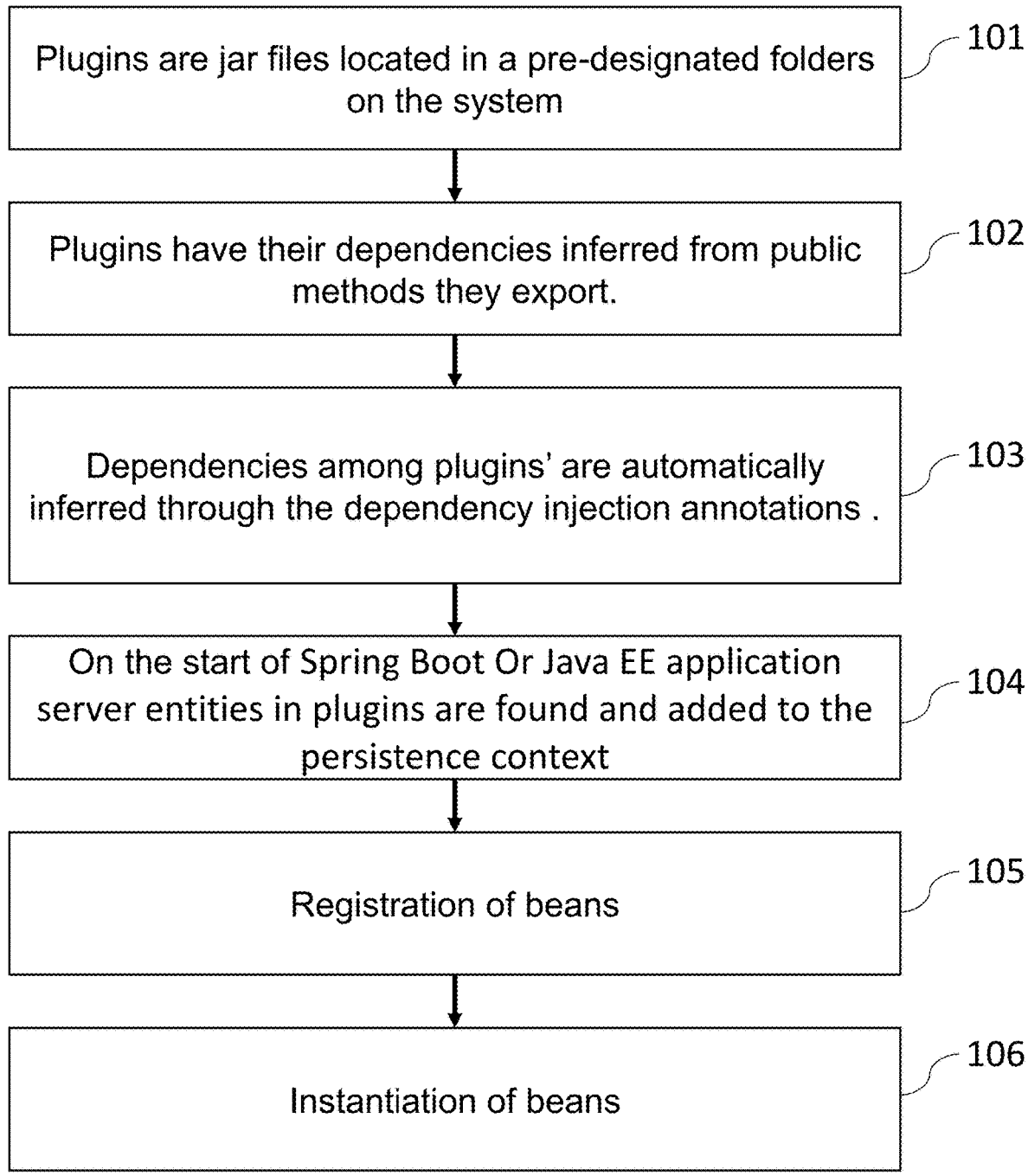
FIG. 1 schematically visualizes the workflow of a computer system for describing plug-ins in accordance with an embodiment of the present invention.

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, embodiments of the invention can include a variety of combinations and/or integrations of the embodiments described herein.

In one embodiment of the present invention, plugin is a software component that adds specific features to an existing computer program. When a program supports plugins, it enables customization without changes to the application itself.

According to one embodiment of the present invention, disclosed herein is a plugin architecture that allows for the easy extension and addition of functionality. A plugin is most commonly a Java Jar file that contains a set of resource files, and/or Java class files. The plugins are stored on a local directory or could be loaded form a web site using included APIs. Specifically, Plugins are Jar files (Java 'binaries'), compiled and packaged separately from the main Spring Boot Application or from main Wildfly War/Ear. Generally, there are two types of Jars: Entities for domain model definitions, or Plugins, defining business services, data repositories, APIs and practically all the services a Spring Boot Application or Java EE application server can provide. The locations for both types of Jars (Entities, Plugins) have default values and these default values can be overridden by configuration. Plugins use the standard annotations and meta-data paradigms used for Spring Boot or for Java-EE and the Entities use standard JPA annotations for entity definition, indexes, relations etc.

According to a preferred embodiment of the present invention, disclosed herein is a monolithic application that describes a multi-tiered software application in which the API and data access code are combined into a single program from a single platform. A monolithic application is self-contained, and independent from other computing applications apart perhaps database servers and some third party external services. The most common drawback of the monolithic application is, this approach has a limitation in size and complexity. Additionally, this application is too large and complex to fully understand and made changes rapidly and correctly. Moreover, the entire application must be recompiled, retested and redeployed on each update.

FIG. 1 schematically shows the different aspects of the invention, wherein describing plugins 101 are jar files located in a pre-designated folders on the system, plugins dependencies are inferred from injection points and from available public method 102,103. Spring system is based on PF4J plugin system. PF4J is not used in Java EE solution and an internal solution is provided. Once the main deployment is deployed or the Spring Boot jar is started 104, registration 105 and instantiation 106 of beans happens as shown in the FIG. 2 and FIG. 4.

Figure 2:
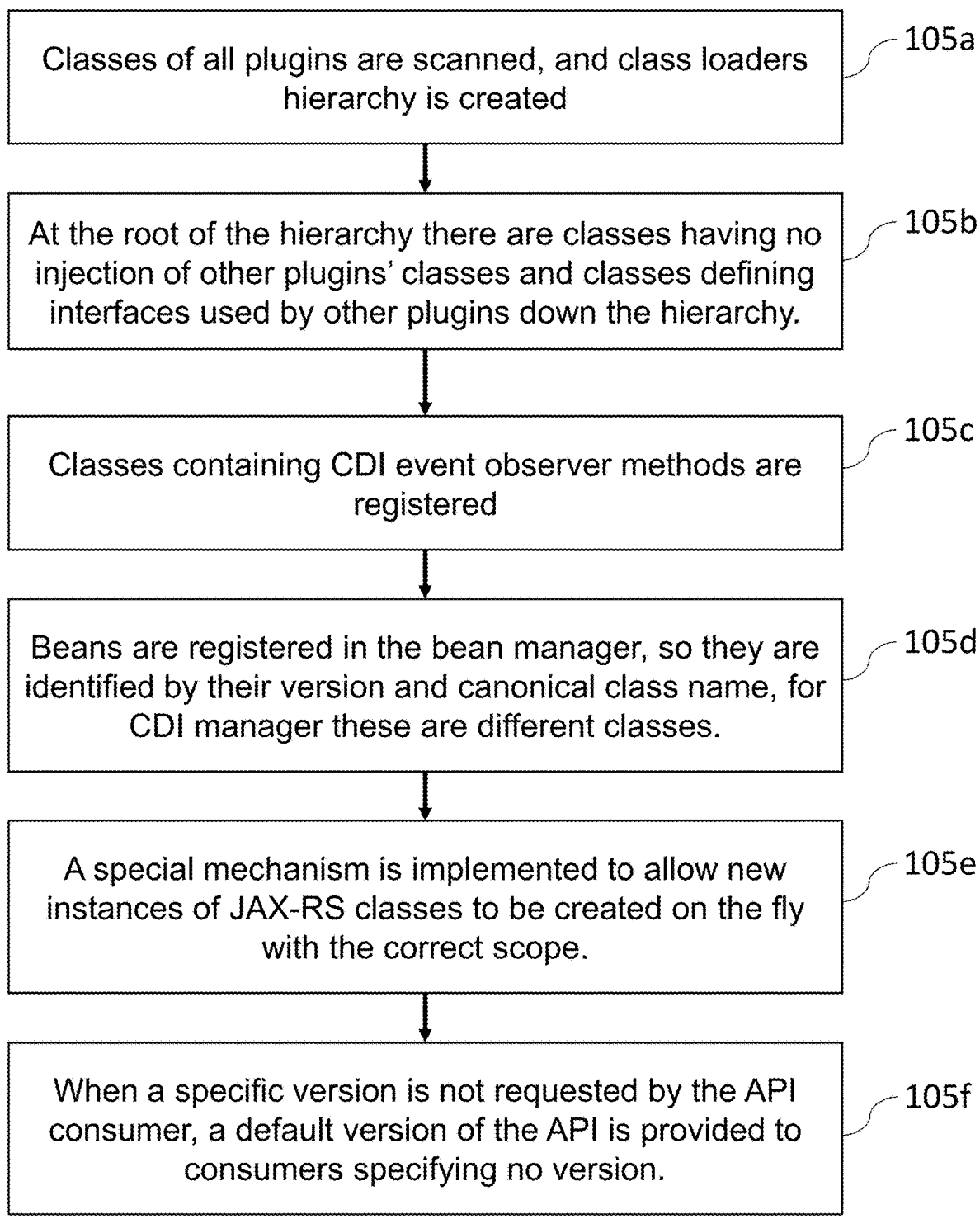
FIG. 2 provides flow diagram describing registration of CDI Beans.

Now, referring to FIG. 2 flow diagram describing the registration of CDI Beans (Java EE): Classes of all plugins are scanned, and class loaders hierarchy is created 105*a*. In the next step, at the root of the hierarchy there are classes having no injection of other plugins classes and classes defining interfaces used by other plugins down the hierarchy 104*b*. In the further step, classes containing CDI event observer methods are registered 105*c*. In the next step beans are registered in the bean manager, so they are identified by their version and canonical class name, for CDI manager these are different classes 105*d*. In the later step, a special mechanism is implemented to allow new instances of JAX-RS classes to be created on the fly with the correct scope 105*e*, for example Request Scope while having plugins' required services to be injected into them, this is done through a special interceptor that changes the scope from CDI point of view to singleton while providing other scopes. Lastly, the mechanism as shown in the in previous step allows the same service class to co-exist in multiple versions. When a specific version is not requested by the API consumer, a default version of the API is provided to consumers specifying no version 105*f*.

Figure 3:
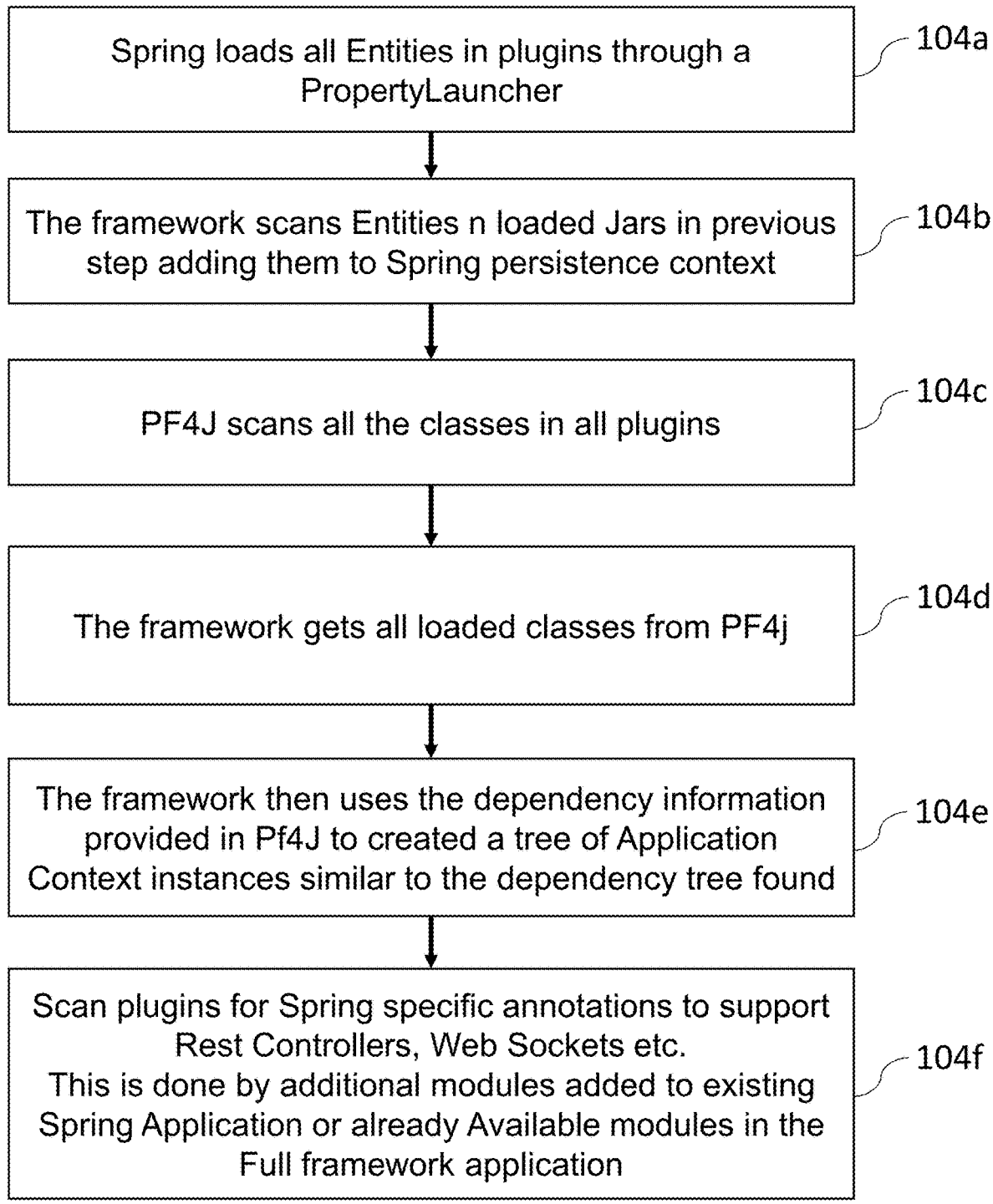
FIG. 3 provides flow on instantiation and registration in Spring Boot.

In the same embodiment of the present invention, refereeing to FIG. 3, a method of loading is disclosed wherein, Spring loads the Entities in Entities jars through properties launcher in a single class loader 104*a*. The framework scans the entities loaded by the single class loader of Spring, adding all Entities to the persistence context 104*b*. Thus, Spring apply changes to the database schema if required and is aware of entities defined in entities Jars. Plugins Jars are annotated by the PF4J @Extension so all included classes are loaded by PF4J and the framework now scans the classes and creates an ApplicationContext for each separate Jar (plugin) 104*c*. The framework creates hierarchy of ApplicationContext instances mirroring the dependencies among the plugins per the information found by PF4J where the main ApplicationContext includes an Object provider that is implemented by the framework and used to provide instances that are found in other ApplicationContext(s). Additionally, modules added to the Spring Boot Application use PF4J plugin manager to fetch all loaded extensions and classes inside plugins 104*d*. Using Spring annotation support, each module fetches the relevant annotations. For example, the Module responsible for Spring RestController support, finds REST endpoints in plugins and register these in Spring. WebSockets in plugins, Spring Health support, GraphQL support etc. is added. The framework then uses the dependency information provided in Pf4J to created a tree of Application Context instances similar to the dependency tree found 104*e*. Scan plugins for Spring specific annotations to support Rest Controllers, Web Sockets etc. This is done by additional modules added to existing Spring Application or already Available modules in the Full framework application 104*f*.

Figure 4:
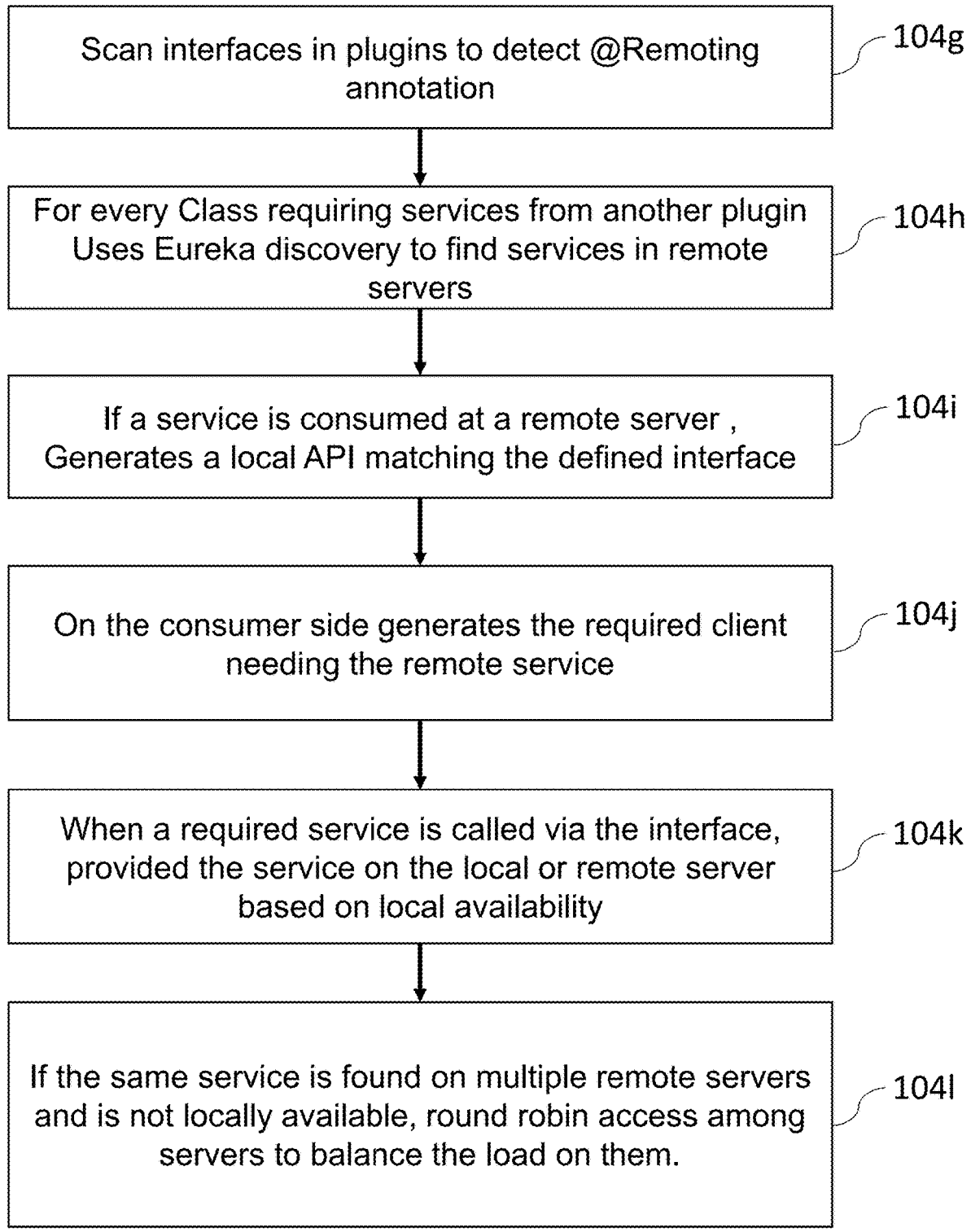
FIG. 4 provides flow on instantiation and registration in Spring Boot in a case if the services plugin exposes are consumed through an interface.

Now refereeing to FIG. 4, in a case if the services plugin exposes are consumed through an interface the following steps would be applied: Detect Java interfaces with the Remoting annotation on them where it is assumed that a Jar with interfaces declarations is placed in all servers (potentially running Micro-services) having plugins/code in application depending on services defined in the said interfaces 104*g*. The discovery of remote services is carried out by Spring Eureka 104*h*. Deployment of actual implementation of the said interfaces can be local or remote (on the local area network). If local, the system allows standard, 'in-process' access to the services, if not found locally. the system transparently provides the service(s) from a remote server 104*i*. On the consumer side generates the required client needing the remote service 104*j*. The system creates, transparently, the required APIs and access to them to provide 'under the hood' access to remote services. When a required service is called via the interface, provided the service on the local or remote server based on local availability 104*k*. When multiple services are deployed on several servers, load balancing among them is provided 104*l*.

Now turning to FIG. 5, the flow diagram describing instantiation of beans in Java EE 106: In CDI Beans are being instantiated when explicitly required to by code (get plugins method), when injected into another currently instantiated bean, the injected beans will be created 106*a*. In the next step, upon CDI events the system instantiates the bean 106*b*. In final step, upon activation of a JAX-RS resource a special interceptor instantiates a new instance of the required JAX-RS bean at the correct version 106*c*. In Spring instantiation of beans is eager, unless specifically annotating a bean for a lazy operation, beans not residing on the same ApplicationContext are provided by FlexiCore through the use of the ObjectProvider provided by Spring in every ApplicationContext created (for each plugin)

Figure 6:
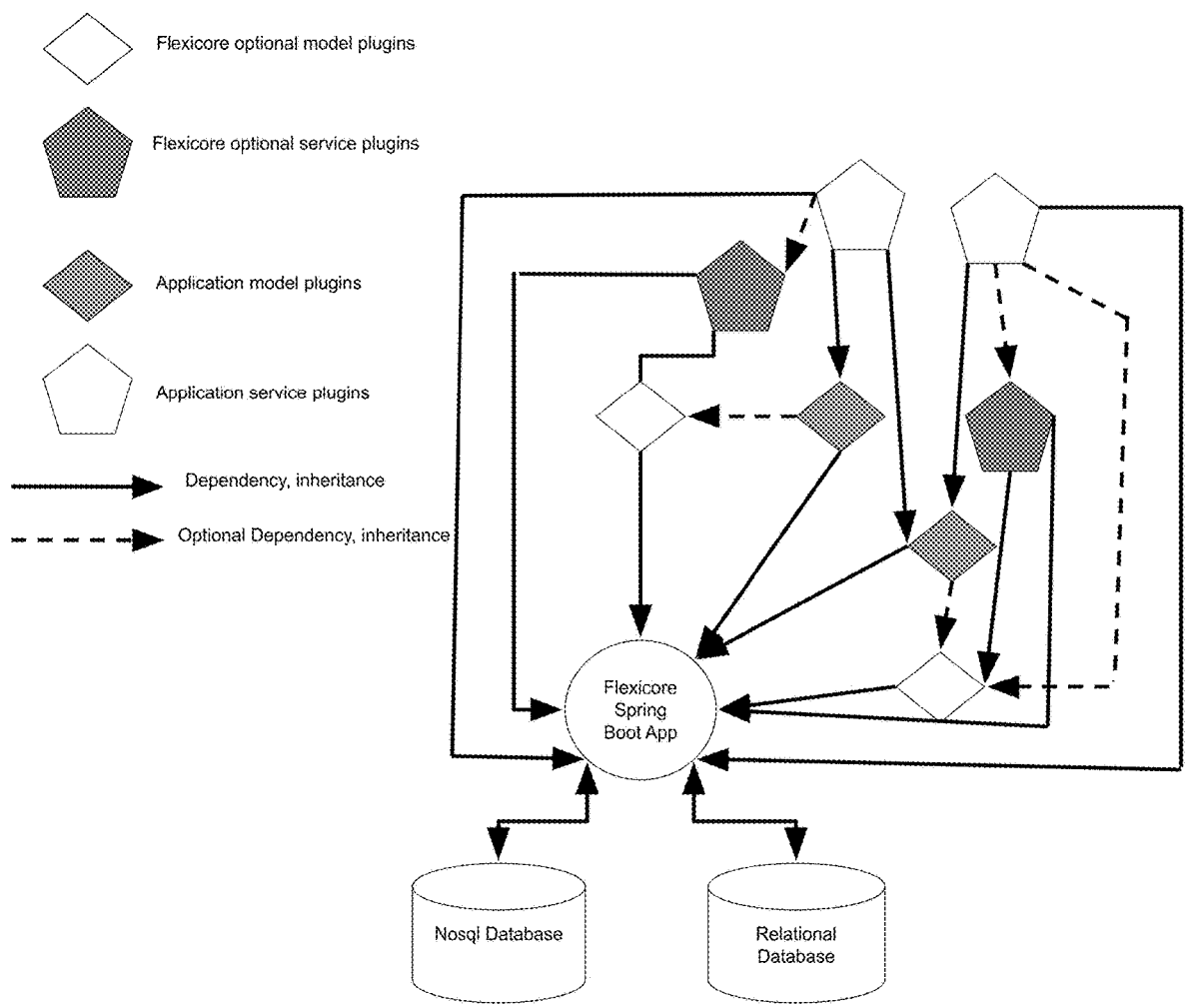
FIG. 6 provides an interactive workflow of Flexicore optional model plugins and service plugins with the application model plugins and service plugins showing the dependency inheritance with the Flexicore Spring Boot App.
Figure 7:
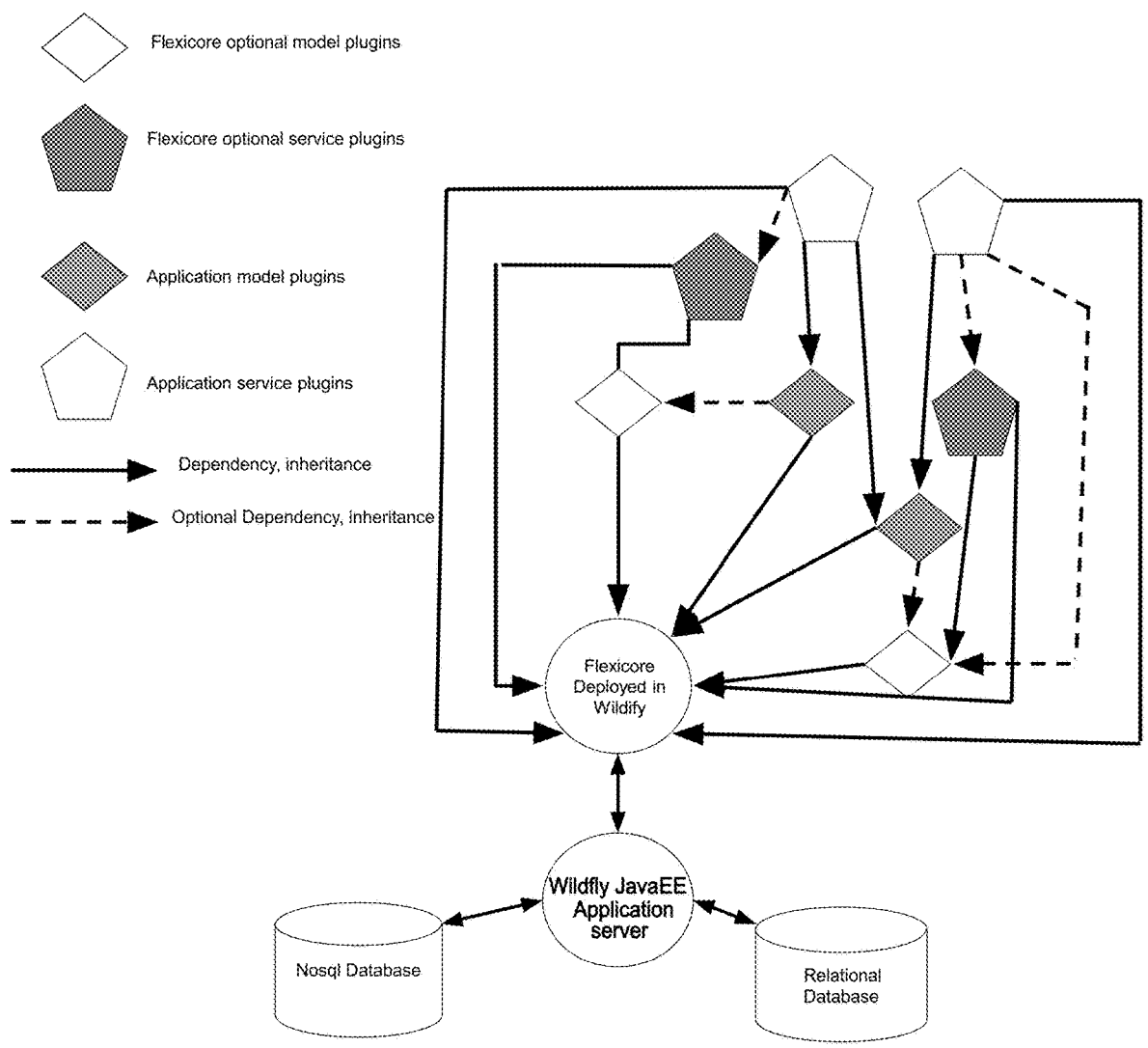
FIG. 7 provides an interactive workflow of Flexicore optional model plugins and service plugins with the application model plugins and service plugins showing the dependency inheritance with the Flexicore deployed in Wildfly Java EE Application Server.

Referring to FIG. 6 and FIG. 7, in a preferred embodiment of the present invention, the dependency and inheritance are always in one direction. Specifically, Flexicore service and model never need a change to support the plugins new features. In addition, depend-on model and service plugins provided by Wizzdi, third party or the user may never need a change to support new features or new plugins depending on them. The example provided in the FIG. 5 and FIG. 6 is typical and can change in actual implementation however, the rule regarding direction of inheritance and dependency always applies.

In the same embodiment of the present invention, Spring @Autowired and Java-EE @Inject are used to specify dependency injection among Beans. Particularly, Java extends keyword is used to define Entity inheritance among entities in the same or different jars, Entities in Jars ('plugins') can extend entities defined in Spring Boot application or In Java EE War/Ear. Additionally, apart from Jars (plugins/model jars in the designated folders mentioned above), the system uses the following possible deployment options: Spring Boot App provided with the framework itself, used for new implementations fully based on plugins. Existing Spring Boot App which can be improved to use the framework modules starting with plugins support, later optionally adding other modules. This approach is suitable for boosting existing Spring Boot apps with plugins modularity and with additional framework features. Similarly, apart from the module responsible for plugins operations, there are additional framework modules that can be optionally added to the Spring Boot application adding more plugins features. Thus, the main Boot app is flexibly built to include only the framework features the users would require, it should be stressed out that. When the Spring Boot Jar is the framework itself, that is, not another Spring Boot application, all framework available modules are normally added to cover all Spring options plugins can expose (as supported by the framework).

In the same embodiment, the remoting support allows easy change to the plugins distribution in a Microservices architecture as follows: Start with a single process with multiple plugins, move some of plugins to other servers on the network and optionally remove them from the local system, there is no additional operation required if services of a plugin are consumed through a Java interface by depend-on plugins. The interface definition jar file must be available on all servers having plugins depending on the service and when multiple servers have the same plugins deployed providing services to other server, automatic round-robin load balancing is provided.

In Java EE, according to the same embodiment of the present invention, unlike during the standard CDI bean managers creation, bean managers are created after the deployment is up and running.

In Java EE, according to the same embodiment of the present invention, using the plugin information annotation and event bus annotations, the plugin classes are scanned towards the leave till there are no depend-on plugins.

In Java EE, according to the same embodiment of the present invention, the traversal maps the required versions of the plugins inside a memory resident map.

In Java EE, according to the same embodiment of the present invention, once bean managers are created, all bean with auto-instantiate or these required for health monitoring are instantiated.

In Java EE, according to the same embodiment of the present invention, a special mechanism was implemented to allow new instances of JAX-RS classes to be created on the fly with the correct scope, for example request scope while having plugins sourced services to be injected into them, this is done through a special interceptor that changes the scope from CDI point of view to singleton while providing other scopes.

According to the same embodiment of the present invention, the in above mentioned mechanism allows the same service class to co-exist in multiple versions. When a specific version is not requested by the API consumer, a default version of the API is provided to consumers specifying no version. This supported in both Java EE and Spring implementations of the network.

According to the same embodiment, a method of supporting existing Spring Boot applications is disclosed, wherein the supporting further includes steps of:
  i. providing multiple Spring modules each responsible for a set of capabilities when the Spring boot app is already available;
  ii. adding set of capabilities to the app when a module is added to Spring boot App; (for example, the FlexiCore Boot module adds plugins support as described in this patent application. If only this module is added, only plugins support is available, additional modules add more features, if the complete module set is added, the existing Spring application is similar in FlexiCore capabilities to the fulle FlexiCore Spring app.)
  iii. using Spring boot app as a hosting application of plugins when starting from a fresh application where all of the application features are implemented in plugins.
  iv. developing a hybrid approach by starting with a fresh Spring Boot application, adding some of the application specific code to the application, and other features in plugins wherein in the above steps developers can control the size of the Spring Boot application by deciding which modules to include.

According to one embodiment of the present invention, an Object-Relational Mapping (ORM) and data repositories are disclosed. In this, code first approach is used as the system heavily relies on entities inheritance. However, when existing application (Spring) uses database first approach or even refrain from using ORM at all, new plugins can be built to either access the database through Code first ORM approach or not. Further, entity plugins (jars going into entities folder) are 'equal citizens' in their ability to define entities, inherit from framework entities or from other plugins defined entities. Specifically, in Java EE a special fast entities loader is activated ahead of deployment for updating the system persistence .xml with all entities the system requires. This is added to the script running the application server. Similarly, in Spring the above is not required as new entities discovered through the @Entity annotations and are added to JPA persistence context dynamically. Additionally, entity plugins defined entities (classes) can be injected into service plugins so the model they define can be referred to in services. In the further step, database schema is changed to reflect the current list of entities, this is done by the standard JPA 2.1 support. In the next step, database access through criteria API 2.1 is used. And in the final step, the system includes easy to use functions in its data repository allowing but not mandating the following workflows:
  i. Use the available data repositories in the framework and other Plugins up in the dependency hierarchy.
  ii. Extend the filtering Information Holder class with your own filter, such filters can be used on complex joins.
  iii. Extend data repositories by adding new methods to new repositories extending existing ones.
  iv. Pass additional predicates to existing data methods in existing repositories.
  v. The above set of services greatly simplify data access while using type safe query API.

In a further embodiment of the present invention, plugins can define (via annotation on the REST endpoint) new Operation instances in the database, this is done by the invention transparently so administrators can link these instances with roles, users and tenant instances defining an exceptionally fine granularity access system for REST and data access. Specifically, when entities in new plugins extend the system base class entity or any entity extending it directly or indirectly in the core system or any plugin the new model depends on, access control to instances the solution provides is available in exceptionally fine granularity including the following:
  i. Instances will be created in the correct user tenant, if the user can access multiple tenants, allow defining the correct tenant through impersonating.
  ii. Define default behavior for accessing the new Entity type for Tenant, Role or User in the context of any of the above operation.
  iii. Define allowed access to any instance of the new entity for Tenant, Role or user overriding the default behavior defined on the Entity class.
  iv. Include multiple instances in instances' groups (many to many) to ease access definition on multiple instances by different context rather than type (Entity class).

In accordance with an embodiment, the present invention is novel as it particularly provides dependency injection in one direction among plugins, to any depth, without limiting the solution in anyway.

In accordance with an embodiment of the present invention, building Java EE server applications or Spring Application from components and only from components defined in plugins while using the benefits of a single process implementation and truly decupled parent child dependency which is not provided by other technologies disclosed in the prior art.

In accordance with an embodiment of the present invention, the present invention is that the invention can be used by almost any development team using Java for back end enterprise development.

Figure 8:
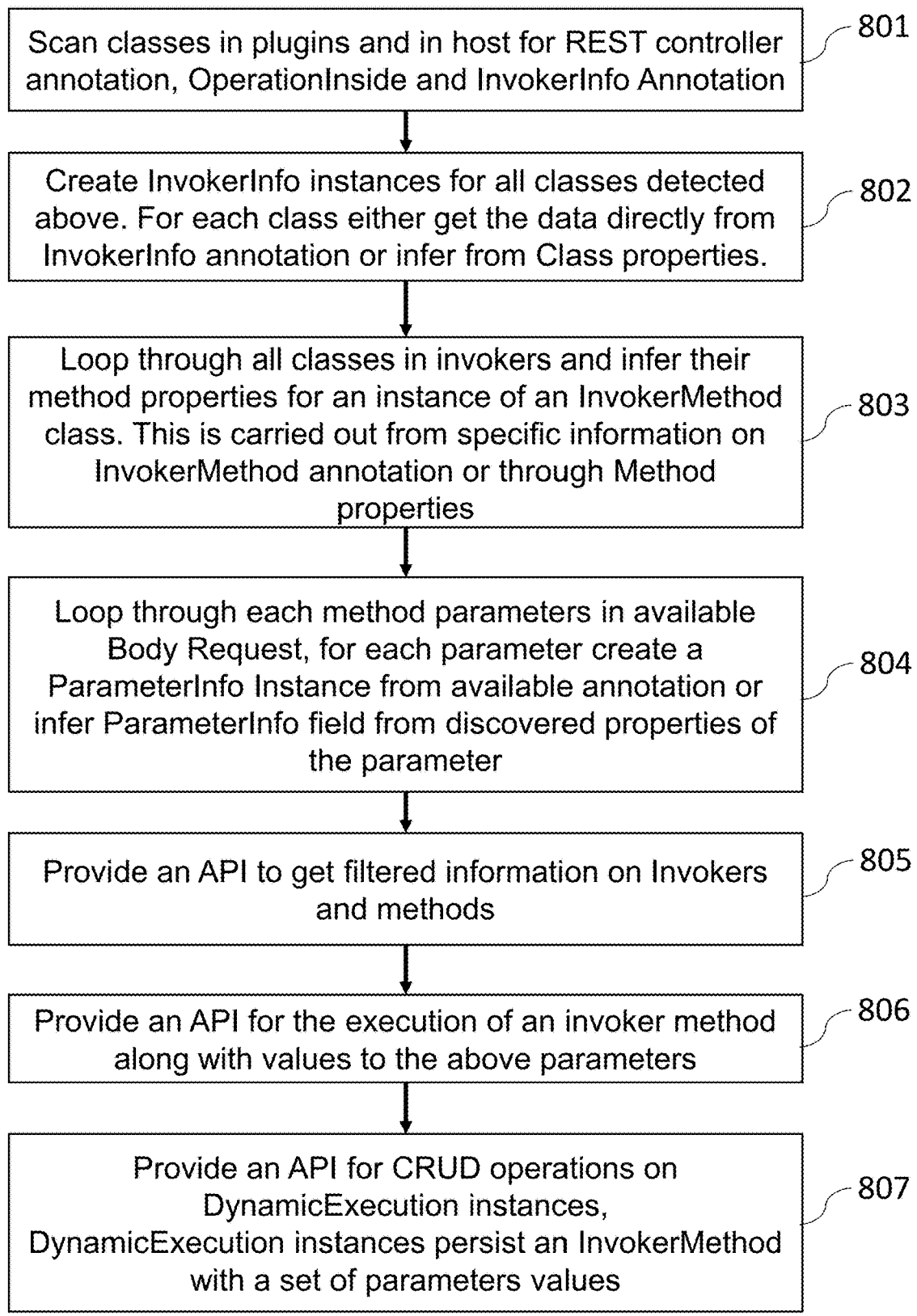
FIG. 8 provides the flow and steps involved in creating Invokers, Invoker methods and ParameterInfo.

In an optional embodiment referring to FIG. 8, Invokers module is disclosed wherein the Invoker is the term for a class holding methods for dynamic access by clients and is responsible for the dynamic user interface support for plugins disclosed in the present invention. Specifically, the Invokers module scans for Spring RestController annotation 801, Classes annotated with OperationsInside annotation and classes with explicit InvokerInfo annotation wherein OperationInside is a Java annotation indicating that the class has methods that can have the @Operation annotation and the InvokerInfo annotation defines a metadata on such class. In the case of explicit InvokerInfo annotation, the Invoker is created directly from the annotation fields, this includes the HandlingType of the Invoker and additional fields 802. Here, the InvokerInfo annotation defines a metadata on such class and the HandlingType refers to the main class handled by the class. In other cases (RestController and OperationInside), the system infers the required metadata for the InvokerInfo class from the implicit data in the classes. OperationInside is a name of a Java annotation denoting a class as a target for an Invoker creation.

In the same optional embodiment, a MethodSubject is defined is the method return type. The Invoker handling type is the most common MethodSubject found among all methods in the Invoker's class. Here, MethodSubject is our term for 'something describing the main subject of a method. For example, if a RestController defines a CRUD (Create, Read, Update, Delete) api for a Book, the handling type will be of type Book as create and update will both return a Book instance. Once the InvokerInfo instance is created, the system loops through all methods in the class regardless of the source of the InvokerInfo instance 803. Particularly, for each method that looks for InvokerMethodInfo, this is an optional explicit metadata on the method. If exists, use it (add an InvokerMethodInfo instance to the already created InvokerInfo instance. Further, looping through each method parameters in available Body Request, for each parameter create a ParameterInfo Instance from available annotation or infer ParameterInfo field from discovered properties of the parameter 804. Providing an API to get filtered information on Invokers and methods 805. Providing an API for the execution of an invoker method along with values to the above parameters 806. Providing an API for CRUD operations on DynamicExecution instances, DynamicExecution instances persist an InvokerMethod with a set of parameters values 807. If an explicit InvokerMethodInfo isn't found, the system creates one using the following rules: Create name and description based on the method name; Infer the related method information as follows:

Yet another embodiment, for each method name, find in the same class (Invoker) another method with the same name +'_state', if found, this is the RelatedMethod for the said method an example, if we have a method called startEngine and another method called startEngine_state the RelatedMethod of startEngine is startEngine_state. This is provided so a generic User Interface can show the state of an engine on some dialog box, for instance, before a user changes it state (for example between On and Off), what is significant is its use in providing initial state to a generic user interface, Additionally, the framework provides automatic generation of Method Category. The category of a method provides hints to the way the method should be used at the User Interface. Methods may have Category=ACTION, Category=TYPE_ACTION, or no Category. The system infers the Category value as follows: If a method returns the framework PaginationResponse class, the method has no category, such a method can be treated as a data source (in a similar way SQL SELECT is). If the method has in its name the string 'create' it indicates that the method has Category of TYPE_ACTION. This indicates that the Method can be used on the Type/Class level and not on a selected instance. In a typical generic User Interface, for example a DataGrid, such method can be used to create an instance or to perform some action on the class in general. All other methods are treated as of Category ACTION, it describes these methods applicable to an instance of the related HandlingType. For example if the type is ElectricEngine, methods having Category ACTION: startEngine, stopEngine, updateEngine, deleteEngine. Regardless of the Category of a method, the front-end (or a different system) will need to pass parameters to the method. Steps in providing meta-data to parameters are described below: The system finds the Body of the request (Optional for all request types apart for GET); Fields in the request are collected, this goes up the class inheritance tree if the request class extends some other class. For example, it is quite common that the request body include a filter instance that inherits from some generic base filter. For each field in the body, the system searches for explicit ParameterInfo annotation. If one exists, the class describing this field is instantiated. The ParameterInfo class include, among others, the following fields: name; description that can be used as a tooltip in some form allowing users to fill data for method invocation; displayName; type: This will dictates if a potential user interface; defaultValue: the default value of this parameter (if a relatedMethod is unavailable to fetch the current values; regexValidation; Provides a client side validation, optional; rangeMax: When the type is numeric, if range is defined with or without valueStep, User Interface can show a Slider and not a Spinner; rangeMin; valueSteps; idRef; If this is true, the value expected is an instance of another type, the UI may need to call another API to fetch it; List: If idRef-true and List is true, will allow selection of multiple values from a presented list; mandatory; actionId; idRetType: Defines the type of the required object in this parameter if the value of idRef is true. List<ParameterInfo> subParameters; parameters can be nested to any level allowing metadata of nested field.

It is important to note that the terms used in the list above are arbitrarily named and only the purpose of them is significant.

If the ParameterInfo annotation is unavailable on a field, the system proceeds to infer the values for a ParameterInfo class it will instantiate. If the field is annotated with JsonIgnore it is ignored. Otherwise: The name of the field becomes the name and displayName of the ParameterInfo instance. If the field name is of the pattern xxxxId, then the field is considered to be a reference of an instance of type xxxx and it will store it's id, in terms of a user interface, the this field should allow selection from a list of instances of type xxxx in a grid, list or a drop down. The system provides APIs to use the created instances of Invokers,Methods and Methods parameters. These APIs are typically used by client (front-end) side to create a fully generic user interfaces that can adapt to new domain model, services and APIs in the backend side without a single change.

This scenario refers to Invoker module flows and APIs described above. Front end code displays available invokers and method to administrator. The administrator select a specific method that returns data (PaginationResponse). The administrator can optionally change parameters of the selected method, these are typically filtering parameters of the said method. Back end saves this as a data source, backend can provide APIs for that. At a later stage, users can use defined data sources to create grid views (also persisted to backend using API). Gridview editing can provide a list of fields in the returned data for columns selection. Gridview editing can provide the definition of run time filters, these will be presented to the user using the grid. Similar to grid views, rule engines, dashboard presets can all be implemented to consume any API without any effort from front end designer side.

The present invention is described above with reference to a preferred embodiment. However, those skilled in the art will recognize that changes and modifications may be made in the described embodiment without departing from the nature and scope of the present invention. To the extent that such modifications and variations do not depart from the spirit of the invention, they are intended to be included within the scope thereof.

Having fully and clearly described the invention so as to enable one having skill in the art to understand and practice the same, the invention claimed is:

1. A method for componentization of backend applications using plugins, wherein the method comprising steps of:
 a) identifying the plugins that are jar files located in a pre-designated folders on a system;
 b) deploying the spring boot jar, wherein the said deployment of spring boot jar further includes steps of:
  i. updating persistence context with new entities found in designated folder;
  ii. collecting available service plugins using available or built in libraries;
  iii. creating plugins dependency trees;
  iv. creating an Application Context with depend-on plugins for every plugin;
  v. creating an AspectJ proxy to allow security imposed policies to take place when a REST method is called;
 c) registering beans, wherein the said registration of beans further includes steps of:
  i. scanning the classes of plugins and creating a class loaders hierarchy in Java EE, wherein at a root of the said hierarchy there are classes having no injection of other plugins classes and classes defining interfaces used by other plugins down the said hierarchy;
  ii. registering classes containing CDI event observer methods in Java EE;
  iii. registering beans in the bean manager in Java EE, so that the said beans are identified by their version and canonical class wherein, for CDI manager these are different classes;
  iv. allowing new instances of JAX-RS classes to be created on the fly in Java EE with the appropriate scope and allowing the said service class to co-exist in multiple versions;
  v. providing a default version of API to consumers in both Java EE and Spring implementations, when a specific version id not requested by the API consumer;
 d) instantiating beans in Java EE and Spring, wherein in the installation further includes steps of:
  i. instantiating the beans in Java Eh, when explicitly required to by code and injecting into another currently instantiated bean further creating injected beans;

ii. instantiating the bean in Java EE, by the system upon CDI events;
iii. activating a JAX-RS resource and a special interceptor instantiates a new instance of the required JAX-RS bean at the appropriate version in Java EE;
iv. instantiating all beans in Spring on start unless Spring beans are annotated for lazy instantiation this is the normal Spring behavior;

e) supporting existing Spring Boot applications, wherein the supporting further includes steps of:
   i. providing multiple Spring modules each responsible for a set of capabilities when the Spring boot app is already available;
   ii. adding set of framework capabilities to an existing/new Spring app when a module is added to Spring boot app;
   iii. using Spring boot app as a hosting application of plugins when starting from a fresh application where all of the application features are implemented in plugins;
   iv. developing a hybrid approach by starting with a fresh Spring Boot application, adding some of the application specific code to the main host application, and other features in plugins;

f) creating Invokers, Invoker methods and ParameterInfo by scanning API end points of both core application and plugins, wherein the Invokers creation further includes steps of:
   i. enabling each REST controller to become an Invoker;
   ii. enabling any service to become an Invoker if explicitly annotated;
   iii. enabling each Invoker to have a HandlingType it manages, that is, its methods deal with;
   iv. enabling each REST API end point to become an InvokerMethod;
   v. inferring the list of ParameterInfo of each Invoker method defined to accept a Request Body;
   vi. dynamically adding category or similar meta data to the created methods;
   vii. enabling use of categories by a user interface to infer use of a method;
   viii. enabling developers to add additional meta data to invoker methods and invoker methods parameters so definitions of value ranges are present on the method parameters for the creation of specific dynamic User Interface;
   ix. inferring from context or use existing annotations parameters requiring foreign ids of instances, add the required metadata so front end code can correctly allow selection of such foreign objects through subsequent calls to the backend;
   x. enabling methods to have names, display name, description where these are added to the method in the Invoker;

g) providing required APIs to manage Invokers and methods wherein the said providing further includes steps of:
   i. enabling API to get a list of Invokers and their methods with an optional filtering by handling type, method name and invoker name;
   ii. providing an execute InvokerMethod API, wherein the said API receives a dynamically populated set of parameters where the said parameters are fully defined in the returned list of Invokers and their included methods;
   iii. enabling an API to get a sample of InvokerMethod returned data regardless of data presence on backend;
   iv. including parameters such as a filter responsible for narrowing down the result set in the case of a data fetching method and standard parameters set when appropriate, specifically when the method changes state of an instance; and h) providing required APIs to persist in a system database, a set of data aware entities making use of predefined Invokers Methods and optional pre-populated parameters so these can be used in DataGrid, Dashboard, trees and rules.

2. The method of claim 1, wherein the said dependency and inheritance are always in one direction.

3. The method of claim 1, wherein depend-on model and service plugins never need to be changed when services and entities in plugins depending on them undergo changes and improvements.

4. The method of claim 1, wherein unlike during the standard Java EE CDI bean managers creation, bean managers are created after the deployment is up and running.

5. The method of claim 1, wherein in said Java EE, using the plugin information annotation and event bus annotations, the plugin classes are scanned towards the leaves till there are no depend-on plugins.

6. The method of claim 1, wherein in said Java EE, once bean managers are created, all bean with auto-instantiate or these required for health monitoring are instantiated.

7. The method of claim 1, wherein the said method allows the same service class to co-exist in multiple versions and when a specific version is not requested by the API consumer, a default version of the API is provided to consumers specifying no version.

8. The method of claim 1, wherein in said Java EE, the said method allows new instances of JAX-RS classes to be created on the fly with the correct scope.

9. The method of claim 1, wherein the said method supporting existing Spring boot applications enables developers to control the size of the Spring Boot application by deciding which framework modules to include.

10. The method of claim 1, wherein the said method uses Spring ObjectProvider to transparently provide services available in depend-on plugins.

11. The method of claim 1, wherein the said method uses standard Spring dependency injection to inform the system that a service is required inside another service.

12. A method of claim 1, wherein the said method uses Java extends keyword to allow entities in on plugin to extend entities in another plugin and in the main Spring Boot or JavaEE application.

13. A method of claim 1, wherein the said method allows the @Onetomany, @Manytoone and @onetoone annotations to reference entities in other plugins and in the main Spring application or Java EE one.

14. The method of claim 1, wherein the said Spring services such as REST controllers, jax-rs web sockets, Swagger, GraphQL, Spring data rest, remoting, health check available in plugins are registered in Spring by the appropriate module in the main Spring Application.

15. The method of claim 1, wherein the said Plugins providing their services through Java interfaces can have methods annotated as remote methods.

16. The method of claim 1, wherein the said depending classes in plugins can transparently receive services from depend on plugin whether the services are running inside the same process with them or available on another process in the same system or a remote one.

17. A method of claim 1, wherein the said API endpoints are created on remote services so depending services can have service requests fulfilled regardless of the location of depend-on services.

18. A method of claim 1, wherein the said services requiring remote services transparently receive remote services through proxy implementation of the same interfaces used when accessing services on the same process.

19. A method of claim 1, wherein the said requests generated in a depending service or method is converted to remote REST API call if the depend-on service is not available on the local process.

20. The method of claim 1, wherein the said support for dynamic User Interface is unique, there is GraphQL, however, it requires special support on the backend when new APIs are defined, it also requires joins and query logic to be performed in memory of the server and not in the database and the said method requires no extra work and runs all queries on the database.

21. The method of claim 1, wherein the Invoker is the term for a class holding Methods for dynamic access by clients.

* * * * *